United States Patent Office 3,426,051
Patented Feb. 4, 1969

3,426,051
STABILIZED STANNOUS CARBOXYLATES
Samuel Hoch, Brooklyn, N.Y., assignor to Tenneco Chemicals, Inc., a corporation of Delaware
No Drawing. Filed Mar. 15, 1965, Ser. No. 439,968
U.S. Cl. 260—429.7                 14 Claims
Int. Cl. C07f 7/22

ABSTRACT OF THE DISCLOSURE

Stannous salts, which are widely used as catalysts in the production of polyurethane resins, are stabilized by the addition of small amounts of alkylhydroquinones that have the structure

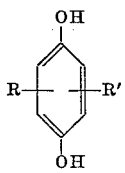

wherein R represents a $C_{1-6}$ alkyl group and R' represents hydrogen or a $C_{1-6}$ alkyl group. The resulting compositions lose little or their stannous tin content on prolonged exposure to air, are light in color, are compatible with the tertiary amines that are commonly used in polyurethane production, and do not react with these amines to form dark-colored products. Particularly satisfactory results are obtained when 2,5-di-tertiary-butylhydroquinone is used as the stabilizer.

---

This invention relates to stabilized stannous salts and to a method for their production.

Stannous salts are widely used as catalysts in the production of polyurethane resins. These salts, however, are not stable when exposed to air and are readily oxidized to the corresponding stannic salts and hydrolyzed to dihydroxytin compounds. Since tin in its stannic state does not effectively promote the reaction between organic polyisocyanates and polyhydric compounds to form polyurethane resins, the utility of the salts as catalysts is dependent upon their stannous tin content. It is therefore necessary to stabilize the stannous salts to insure the presence in the reaction mixture of an amount of stannous tin that is sufficient to catalyze the reaction between the isocyanate and the polyhydric compound.

In addition to retaining their stannous tin content for prolonged periods, it is necessary that the stannous salts be colorless or light in color and that they do not impart color to the polyurethane resin. The stabilized salts should also be compatible with the other catalysts, for example, the tertiary amines, that are ordinarily used in the production of polyurethane resins and they should not react with these amines to form colored reaction products.

In accordance with this invention, it has been found that stannous salts that retain their stannous tin content for long periods of time, that are light in color, and that are compatible with tertiary amines may be prepared by incorporating into a stannous salt a small amount of an alkylhydroquinone having the structure

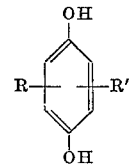

wherein R represents an alkyl group having from 1 to 6 carbon atoms and R' represents hydrogen or an alkyl group having from 1 to 6 carbon atoms. Illustrative of these alkylhydroquinones are the following: toluhydroquinone, ethylhydroquinone, isopropylhydroquinone, tertiarybutylhydroquinone, tertiaryamylhydroquinone, n-hexylhydroquinone, dimethylhydroquinone, di-n-propylhydroquinone, di-tertiarybutylhydroquinone, di-tertiaryamylhydroquinone, dihexylhydroquinone, and mixtures thereof.

Any of the stannous salts that are ordinarily used as catalysts in the preparation of polyurethane resins may be stabilized by the addition of the aforementioned alkylhydroquinones. These include stannous salts of aliphatic monocarboxylic acids having from 6 to 18 carbon atoms and stannous salts of aliphatic dicarboxylic acids having from 4 to 10 carbon atoms, for example, stannous hexoate, stannous 2-ethylhexoate, stannous n-octoate, stannous decanoate, stannous laurate, stannous myristate, stannous oleate, stannous succinate, stannous glutarate, stannous adipate, stannous azelate, and stannous sebacate.

Only a small amount of the alkylhydroquinone need be added to the stannous salt to improve its stability. As little as approximately 0.1%, based on the weight of the salt, will inhibit its oxidation to the stannic form. Three percent or more may be used, but there appears to be no advantage resulting from the use of these larger amounts of the stabilizer. In most cases excellent results are obtained when 0.5% to 1.5%, based on the weight of the salt, of an alkylhydroquinone is used as the stabilizer.

The stabilized stannous salts may be prepared merely by adding the alkylhydroquinone to the salt and stirring until a homogeneous solution is obtained. In some cases it may be necessary to heat the mixture to effect solution of the alkylhydroquinone.

The stabilized stannous salts of this invention lose little of their stannous tin content even on exposure to air for 2 weeks or more. They are light in color and do not impart color to the polyurethane resins. They are compatible with N-alkylmorpholines and other tertiary amines that are commonly used to catalyze the reaction between isocyanates and polyhydric compounds, and they do not react with these amines to form dark-colored products.

The novel compositions of this invention may contain in addition to the stannous salt and stabilizer other materials that are conventionally used in polyurethane resin formulations, for example, water, surface-active agents, blowing agents, solvents, coloring agents, and the like.

The invention is further illustrated by the examples that follow.

EXAMPLE 1

Stabilized stannous salt compositions were prepared by dissolving in stannous 2-ethylhexoate 1%, based on the weight of the stannous salt, of an alkylhydroquinone. The compositions were allowed to stand at room temperature in open containers for 6 weeks. At the end of this time all of the stabilized compositions were clear; which indicated that no appreciable amount of stannic salt was present. The results of these tests are given in Table I.

TABLE I

| Ex. No. | Stabilizer | Compatibility with N-ethylmorpholine | Appearance after 6 weeks' exposure to air | Percent Sn++ | | |
|---|---|---|---|---|---|---|
| | | | | Initial | 6 days | 26 days |
| 1A | Toluhydroquinone | OK | Clear | | | |
| 1B | 2,5-di-tertiary-butylhydroquinone | OK | do | 27.7 | | 26.3 |
| 1C | 2,5-di-tertiary-amylhydroquinone | OK | do | | | |
| 1D | None | OK | Cloudy (2 days) | 27.3 | 23.7 | |

EXAMPLE 2

A series of stabilized salt compositions was prepared by adding 1% by weight of an alkylhydroquinone or a comparative stabilizer to stannous 2-ethylhexoate, heating the mixture to approximately 230° F. to insure complete solution, and then allowing the solutions to stand at room temperature in open containers. Each day the samples were capped and shaken vigorously, and the caps were then discarded. The properties of the stabilized stannous salts are given in Table II.

TABLE II

| Ex. No. | Stabilizer | Compatibility with N-ethylmorpholine | Appearance after exposure to air | Percent Sn++ | | |
|---|---|---|---|---|---|---|
| | | | | Initial | 7 days | 14 days |
| 2A | Toluhydroquinone | OK, slight reddish brown | Milky in 33 days | 26.2 | | 25.9 |
| 2B | 2,5-di-tertiary-butylhydroquinone | OK, very slight reddish brown | Milky in 47 days | 26.4 | | 26.1 |
| 2C | Hydroquinone | OK, reddish brown | Milky in 14 days | 26.7 | 25.9 | |
| 2D | N-n-butyl-p-aminophenol | OK, brown | Milky in 54 days | 26.8 | | 26.3 |
| 2E | N,N'-di-sec.butyl-p-phenylene diamine | do | Milky in 54 days | 26.9 | | 26.3 |
| 2F | None | OK, slight red | Milky in 72 hours | 26.7 | 24.3 | 24.0 |

From the data in Table II it will be seen that the stabilized salts of this invention (Ex. Nos. 2A and 2B) lost little of their stannous tin content on exposure to air for 2 weeks and did not react with N-ethylmorpholine to form dark products, whereas the comparative compositions which contained other compounds that are known to have antioxidant properties either did not satisfactorily inhibit the oxidation of the stannous salt (Ex. No. 2C) or reacted with N-ethylmorpholine to form dark-colored products (Ex. Nos. 2D and 2E).

EXAMPLE 3

A series of stabilized salt compositions was prepared by adding small amounts of mono-tertiarybutylhydroquinone or di-tertiarybutylhydroquinone to stannous 2-ethylhexoate. Samples of these compounds were analyzed after storage under the conditions described in Example 2. The results of these tests are given in Table III.

TABLE III

| Ex. No. | Stabilizer | Percent Sn++ | | | | Percent loss of Sn++ | | |
|---|---|---|---|---|---|---|---|---|
| | | Initial | 15 days | 28 days | 48 days | 15 days | 28 days | 48 days |
| 3A | 0.5% mono-tertiary-butylhydroquinone | 28.84 | 28.30 | 27.60 | 26.25 | 1.87 | 4.30 | 8.98 |
| 3B | 0.5% di-tertiary-butylhydroquinone | 29.03 | 28.42 | 27.77 | 26.79 | 2.10 | 4.34 | 7.72 |
| 3C | do | 29.28 | 28.80 | 28.17 | 26.84 | 1.64 | 3.79 | 8.33 |
| 3D | 0.75% di-tertiary-butylhdyroquinone | 28.86 | 28.26 | 27.70 | 27.32 | 2.29 | 4.02 | 5.34 |
| 3E | 1% di-tertiary-butylhydroquinone | 27.69 | 26.94 | 26.32 | 25.62 | 2.71 | 4.95 | 7.48 |

EXAMPLE 4

Stannous oleate was stabilizer by the addition of 0.375%, based on the weight of the stannous salt, of di-tertiarybutylhydroquinone. This material was analyzed after storage under the conditions described in Example 2. This stannous oleate, which had contained 14.27% Sn++ initially, contained 13.41% Sn++ after 14 days and 12.30% Sn++ after 35 days exposure to air.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A stabilized stannous salt composition which comprises (A) a stannous salt of an acid selected from the group consisting of aliphatic monocarboxylic acids having from 6 to 18 carbon atoms and aliphatic dicarboxylic acids having from 4 to 10 carbon atoms and (B) 0.5% to 1.5%, based on the weight of said salt, of an alkylhydroquinone having the structure

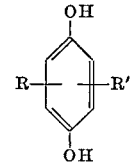

wherein R represents an alkyl group having from 1 to 6 carbon atoms and R' represents a member selected from the group consisting of hydrogen and alkyl groups having from 1 to 6 carbon atoms.

2. A stabilized stannous salt composition which comprises (A) a stannous salt of an acid selected from the group consisting of aliphatic monocarboxylic acids having from 6 to 18 carbon atoms and aliphatic dicarboxylic acids having from 4 to 10 carbon atoms and (B) 0.5% to 1.5%, based on the weight of said salt, of an alkylhydroquinone having the structure

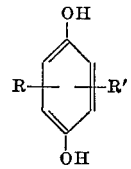

wherein R represents an alkyl group having from 1 to 6 carbon atoms and R' represents a member selected from the group consisting of hydrogen and alkyl groups having from 1 to 6 carbon atoms.

3. A stabilized stannous salt composition which comprises stannous 2-ethylhexoate and 0.5% to 1.5%, based on the weight of said stannous 2-ethylhexoate, of an alkylhydroquinone having the structure

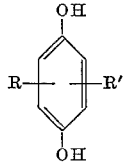

wherein R represents an alkyl group having from 1 to 6 carbon atoms and R' represents a member selected from the group consisting of hydrogen and alkyl groups having from 1 to 6 carbon atoms.

4. A stabilized stannous salt composition as set forth in claim 3 wherein the alkylhydroquinone is toluhydroquinone.

5. A stabilized stannous salt composition as set forth in claim 3 wherein the alkylhydroquinone is mono-tertiarybutylhydroquinone.

6. A stabilized stannous salt composition as set forth in claim 3 wherein the alkylhydroquinone is 2,5-di-tertiarybutylhydroquinone.

7. A stabilized stannous salt composition as set forth in claim 3 wherein the alkylhydroquinone is 2,5-di-tertiaryamylhydroquinone.

8. The method for the stabilization of stannous salts which comprises incorporating into a stannous salt of an acid selected from the group consisting of aliphatic monocarboxylic acids having from 6 to 18 carbon atoms and aliphatic dicarboxylic acids having from 4 to 10 carbon atoms approximately 0.1% to 3%, based on the weight of said salt, of an alkylhydroquinone having the structure

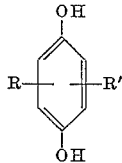

wherein R represents an alkyl group having from 1 to 6 carbon atoms and R' represents a member selected from the group consisting of hydrogen and alkyl groups having from 1 to 6 carbon atoms.

9. The method for the stabilization of stannous salts which comprises incorporating into a stannous salt of an acid selected from the group consisting of aliphatic monocarboxylic acids having from 6 to 18 carbon atoms and aliphatic dicarboxylic acids having from 4 to 10 carbon atoms 0.5% to 1.5%, based on the weight of said salt, of an alkylhydroquinone having the structure

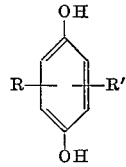

wherein R represents an alkyl group having from 1 to 6 carbon atoms and R' represents a member selected from the group consisting of hydrogen and alkyl groups having from 1 to 6 carbon atoms.

10. The method for the stabilization of stannous 2-ethylhexoate which comprises incorporating into the stannous 2-ethylhexoate 0.5% to 1.5%, based on the weight of the stannous salt, of an alkylhydroquinone having the structure

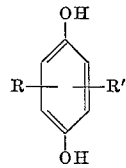

wherein R represents an alkyl group having from 1 to 6 carbon atoms and R' represents a member selected from the group consisting of hydrogen and alkyl groups having from 1 to 6 carbon atoms.

11. The method of claim 10 wherein the alkylhydroquinone is toluhydroquinone.

12. The method of claim 10 wherein the alkylhydroquinone is mono-tertiarybutylhydroquinone.

13. The method of claim 10 wherein the alkylhydroquinone is 2,5-di-tertiarybutylhydroquinone.

14. The method of claim 10 wherein the alkylhydroquinone is 2,5-di-tertiaryamylhydroquinone.

References Cited

UNITED STATES PATENTS

| | | | |
|---|---|---|---|
| 3,043,672 | 7/1962 | Ecke et al. | 252—404 XR |
| 3,032,571 | 5/1962 | Leebrick | 260—429.7 |
| 3,061,418 | 10/1962 | Mills et al. | 252—404 XR |

HELEN M. McCARTHY, *Primary Examiner.*

W. F. W. BELLAMY, *Assistant Examiner.*

U.S. Cl. X.R.

252—404; 260—45.75, 414